US008816840B1

(12) United States Patent
Peterson

(10) Patent No.: US 8,816,840 B1
(45) Date of Patent: Aug. 26, 2014

(54) SELF-CONTAINED, REMOVABLE, WIRELESS TURN SIGNAL SYSTEM FOR MOTOR VEHICLES AND TRAILERS

(75) Inventor: John Samuel Peterson, Kingston, RI (US)

(73) Assignee: Classic Safety Products, LLC, Peace Dale, RI (US)

( * ) Notice: Subject to any disclaimer, the term of this patent is extended or adjusted under 35 U.S.C. 154(b) by 495 days.

(21) Appl. No.: 12/798,219

(22) Filed: Mar. 31, 2010

Related U.S. Application Data

(60) Provisional application No. 61/212,023, filed on Apr. 4, 2009.

(51) Int. Cl.
*B60Q 1/34* (2006.01)
(52) U.S. Cl.
USPC .......................... 340/465; 340/508; 340/425.5
(58) Field of Classification Search
USPC ......... 340/465, 463–464, 468, 472–473, 478, 340/482, 488, 506–508, 514, 425.5, 458, 340/475
See application file for complete search history.

(56) References Cited

U.S. PATENT DOCUMENTS

| | | | | | |
|---|---|---|---|---|---|
| 4,834,060 | A | * | 5/1989 | Greene | 124/78 |
| 5,135,258 | A | * | 8/1992 | Buxton | 280/839 |
| 5,157,338 | A | * | 10/1992 | Motherbaugh et al. | 324/637 |
| 5,195,813 | A | * | 3/1993 | Brown | 362/464 |
| 5,666,103 | A | * | 9/1997 | Davis, Jr. | 340/479 |
| 6,066,951 | A | * | 5/2000 | Maass | 324/414 |
| 6,404,073 | B1 | * | 6/2002 | Chiang | 307/10.1 |
| 6,474,853 | B2 | * | 11/2002 | Pastrick et al. | 362/494 |
| 6,891,338 | B2 | * | 5/2005 | Kubo | 315/291 |
| 7,296,917 | B1 | * | 11/2007 | Chiu | 362/464 |
| 7,921,997 | B2 | * | 4/2011 | Burns | 206/320 |
| 2006/0214595 | A1 | * | 9/2006 | Chen | 315/129 |
| 2009/0091440 | A1 | * | 4/2009 | Roman | 340/479 |

* cited by examiner

*Primary Examiner* — Daniel Previl

(57) ABSTRACT

A wireless, removable vehicle signaling control and illumination apparatus for use on antique vehicles lacking original equipment vehicle signaling devices. The system utilizes a miniature digital radio transceiver inside a lamp housing to provide wireless control of the lamp. This signaling system provides a previously unavailable removable automotive signaling solution for antique vehicle owners who want improved illumination and safety features of modern automotive lighting while leaving the vehicle in "original" and "unmodified" condition, which is of such value to antique vehicle owners.

20 Claims, 2 Drawing Sheets

Figure 1:

[1] System Fault Status Indicators
[2] Battery

[3] Miniature Digital Radio Transceiver / MCU

[4] Glass Globe

[5] Light Emitting Diode (LED) Bank

[6] Miniature Digital Radio Transceiver / MCU

[7] Bubble Level
[8] Battery
[9] Magnet
[10] High Power LED Array and Lens
[11] Miniature Digital Radio Transceiver / MCU

[12] Self Contained, Removable, Radio-Controlled Turn Signal

SELF-CONTAINED, REMOVABLE, WIRELESS TURN SIGNAL SYSTEM FOR MOTOR VEHICLES AND TRAILERS

BACKGROUND

Originally filed as provisional application U.S. 61/212,023, Apr. 4, 2009.

FIELD OF THE INVENTION

This invention relates to automobile signaling lamps, specifically on antique vehicles and trailers that were not factory-equipped with such lamps at manufacture.

BACKGROUND OF THE INVENTION

Antique vehicles are a significant hobby in the United States and worldwide. There are millions of antique vehicles driven on the roads of the United States alone. These vehicles have inferior and sub-standard lighting systems, and in many cases they actually lack certain lighting devices entirely. These vehicles present a serious safety risk to both the drivers of these vehicles and to others on the roadways.

Because the majority of these preserved antique vehicles are still being driven to car shows and for simple pleasure, many accidents occur due to lack of illuminated vehicle signaling lamps. For example, most cars manufactured prior to 1950 were not manufactured with turn signals, had low luminosity lamps, and are perceived in the car community as being unsafe on the roadways. In this document we will assume that an antique vehicle is any vehicle with a date of manufacture before 1967.

The antique car community has also long awaited a safe alternative to the traditional out-the-window "hand signals" that are used to indicate the turning direction of the vehicle. These "hand signals" are not readily understood by today's drivers.

Before the new system being described in this document, many owners of these vehicles continued to operate their vehicles without modern signaling lights, including turn signals, brake lights, running lights, etc. because in the antique vehicle hobby, vehicles that are left "original" and or "restored to original" make up a large percentage of antique vehicles.

These owners are unwilling to cut the vehicle's original wiring, run new wire looms, cut fenders, bumpers, or otherwise physically modify the vehicle, and with good reason. These vehicles, judged as "original" and or "restored to original" are by definition as close to original as possible, and the methods of adding modern lighting to these vehicles has always required extensive modification of the vehicle. These owners know that after countless hours of meticulous restoration, the vehicle would suffer both aesthetically and in value by adding accessory lighting systems.

PRIOR ART IN THE FIELD

Previous to this wireless and removable system, wired accessory lighting kits were available to the antique vehicle enthusiast. A significant disadvantage of these systems, however, was that history showed that many antique vehicle owners opted not to install such systems because they involve the cutting and splicing of original vehicle wiring, cutting the metal body of the vehicle, or otherwise altering it, which in the antique vehicle collecting hobby, is considered highly undesirable, and spoils both the aesthetic and monetary valuation of the vehicle as original.

Another disadvantage to these bolted, wired systems was loose and poorly installed wiring, short circuits, and poor light output and visibility. These systems also lacked fault detection found in modern signaling devices, so often the driver would not know that the signal was not illuminating while driving, because of a burned out bulb, short circuit, or other fault.

A further disadvantage of these systems was cost. The cost of the wiring harnesses, equipment, and installation was considered too high for many antique vehicle owners, who tend to buy and sell their cars with great frequency and would not like the expense of purchasing multiple wiring kits and installation.

OTHER PRIOR ART

While there are many remote control lighting devices invented in prior art, no system has been designed exclusively around the unique needs of an antique vehicle, which have unique requirements in terms of aesthetics, functionality, ease of removal, fault monitoring, and cost.

U.S. Pat. No. 5,195,813 to Brown teaches a system for trucks and off-road vehicles where a remote controller actuates the lighting and control of fog, off-road, and drive lamps. It controls wired, traditional vehicle lamps, which are securely mounted to the vehicle, and are powered by the electrical system of the vehicle. In this design the hard-wiring of power and mechanical attachment of the apparatus would impede the practical removal of such a system at car shows, or every time the car is used. This system as described does not meet the functional or aesthetic needs of antique vehicle owners who are seeking a quickly-removable and self-powered indication system, and importantly, does not provide an independent controller for traditional vehicle lighting such as brake lights, turn signals, hazards etc. but is a device to control accessory lighting (specifically accessory fog and spot lamps) on the vehicle.

U.S. Pat. No. 5,666,103 to Davis teaches of a system for towed motor vehicles that uses a radio-controlled repeater of the tow truck signals, but the controller requires a hard-wire attachment to an existing signaling system assumed to be on the tow vehicle. This system is dependent on the existing turn signal, brake light, and tail light systems of the tow vehicle, and is not a self-contained and independent system that can be actuated by the driver of the vehicle directly without other equipment. Its use would be not practical to use as a removable system.

U.S. Pat. No. 4,859,982 to Seaburg teaches of a magnetic mount, battery-operated turn signal for use in the towing of a disabled motor vehicle. Again, this system requires a hard-wire attachment to an existing signaling system on the tow vehicle, and could not function as a stand-alone system on a vehicle that does not already have a signaling system, cannot be actuated by the driver directly without other equipment. It would also require adding extensive wiring and additional equipment to the vehicle for it to function at all. As taught, this art would require an unacceptable amount of time to disassemble from the vehicle, and require that the car wiring be altered, and would not easily detach from the vehicle if desired.

SUMMARY AND ADVANTAGES OF THE INVENTION

This system solves for the first time, by a unique combination and synergy of technologies, the ongoing challenge of vehicle lighting improvements and presents an enormous safety improvement. Most importantly and unique to this system, this is accomplished without modifying the antique vehicle's body or wired electrical system, leaving the car original, preserving the value of the vehicle, while providing modern lighting safety for both the vehicle and driver.

The system being introduced here is the first to overcome all of the present challenges that have kept antique vehicle owners from upgrading their vehicles to modern lighting.

Several novel advantages and objects of the invented system are described herein:
  a) it provides a quickly removable vehicle signal system for antique vehicles that do not have them and or where the vehicle owner was unwilling to install wired lamps;
  b) it includes as an alternative to, or in combination with the item above, a modified light bulb for installation in existing bulb sockets on antique vehicles that can receive a plurality of signals via radio control, changing, for example, a tail lamp bulb into a radio-controlled turn signal. This is an extremely beneficial system component because it allows the use of existing holes, lights, and sockets on the antique vehicle (if present) to be used for new signaling functions which the vehicle may not have had at manufacture;
  c) it provides safe vehicle illumination and indication of driver intent using modern day high power light emitting diode (HPLED) lighting and other improvements to antique vehicles that would otherwise not have them;
  d) it provides high-efficiency, low power LED lighting arrays that can produce an effective signal which can be used for approximately 500 miles of vehicle driving on a single charge;
  e) it provides vehicle signaling and control without spoiling the aesthetic originality or physical altering of the vehicle, such as drilling of the vehicle chassis, replacement or cutting of wiring harnesses;
  f) it provides a removable vehicle signaling system that warns the driver of conditions in the system that would result in driving without the signals in working order, such as non function of a bulb, low battery, etc;
  g) it provides an inexpensive, non-obtrusive solution to well recognized and long-standing antique vehicle lighting deficiencies which are well known in the hobby;
  h) the entire system can be removed in minutes to maintain the originality of the vehicle when not being driven, providing the best of originality and safety;
  i) it provides great economy because the system can be used on multiple vehicles owned by the collector, and requires the purchase of one system, rather than a system for every vehicle owned, which has tremendous marketing value.

SPECIFICATION

Operation

With the chosen system components placed on the vehicle, (FIGS. 1,2,3) the system logic begins when the vehicle operator actuates the signal controller while driving, sending a unique digital signal to the digital radios on the transceiver bulb lamp (FIG. 2) and or to the removable signal lamp (FIG. 3) to indicate the vehicle's presence and or intent to turn. An auxiliary transceiver controller may also actuate the system (such as a remote brake sensor etc.)

The IC on each system component then decodes a unique digital serial number and command, checks that it is a member of a grouped system, performs the requested system function requested by the controller, and lights the signaling lamps as requested.

The functional result of this logic is the driver's command being delivered, and then the LED array on the removable signal lamp or the transceiver bulb lamp illuminates, providing signaling functions on the vehicle as requested by the driver, warning other vehicles of the vehicle's presence and or intent to turn.

This signaling may come from the removable signal, magnetically-mounted on the vehicle, or from the transceiver bulb, placed into an existing bulb socket on the vehicle. In the case of the transceiver bulb, the bulb might replace a simple tail lamp, but transforms that same lamp into a turn signal and or brake or other illumination signal.

The system code running on the controller (FIG. 1) is designed to detect system faults, such as a non-received signal, a low battery condition, or out of range error. The signal lights on the controller (1) will glow red if there is a fault. This assures that the operator of the vehicle knows that the signals are performing as requested, for an added level of safety. The programming also monitors and warns of low battery, and can even lower the duty cycle or frequency of the illumination based on battery level. This protection prolongs the battery life, and adds in an emergency low-battery condition, and adds yet another level of protection.

After use, the entire system can then be quickly removed and stored by the owner in minutes for showing the vehicle, judging, etc.

DETAILED DESCRIPTION & PREFERRED EMBODIMENT

The invention and system described here is the preferred-embodiment of a remote-controlled vehicular signaling system that includes three (3) 2.4 Ghz, 802.15.4 digital radio and IC microprocessor controlled system components, which individually or in combination add wireless, removable vehicle signaling upgrades to antique vehicles.

The three major components and their parts are described in the drawings and in this description so that the device can be easily understood and built by someone familiar in the art.

FIG. 1 (Controller) illustrates a perspective view (simplified in the shape of chassis design) of the battery-operated vehicle signal lever and controller. This in-car controller (FIG. 1) contains a miniature rechargeable battery (2), a miniature digital radio and micro controller (3), and indicator lights (i) to indicate system status or fault. The controller is magnetically attached to the dashboard or other metal part of the interior of the vehicle. We will refer to this item as the system "controller."

Figure 2:
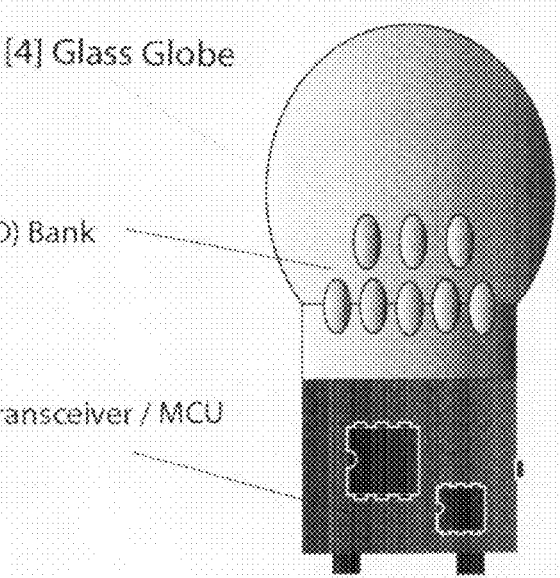

FIG. 2 (Transceiver Bulb Lamp) illustrates a perspective view (simplified in the shape of chassis design) of the third system component, the powered by vehicle, a remote-controlled signal bulb. This standard-sized automotive bulb lamp fits into an existing bulb socket on the antique vehicle. It may replace an already-existing-on-vehicle tail light bulb, turn signal bulb and or brake light on the vehicle. The unique feature of this system component, however, comes from the miniature embedded radio and IC (6) inside the bulb housing (4). This unique quality allows the bulb to be controlled as part of this system, changing brightness, color, or flash rate of the bulb. One embodiment could be a tail light which could be made to brighten and blink as a turn signal. A bank of high power LEDs (5) provide the lighting to correct oscillation. As part of the system described, this bulb can be actuated by the signal controller described above (FIG. 1) or by another embodiment of an actuator on the vehicle, or act as a repeater of a signal to another device (such as a third brake light or other signals) in the system. The clear advantage of this bulb is that it can add the turn signal, brake, marker, or tail light functions to an existing bulb on the vehicle that may not have those functions. We will refer to this system item as the system "transceiver bulb." In many cases, a vehicle would combine this transceiver bulb with the removable signal if the vehicle has tail lights in the rear, but no signals in the front of the vehicle.

Figure 3:
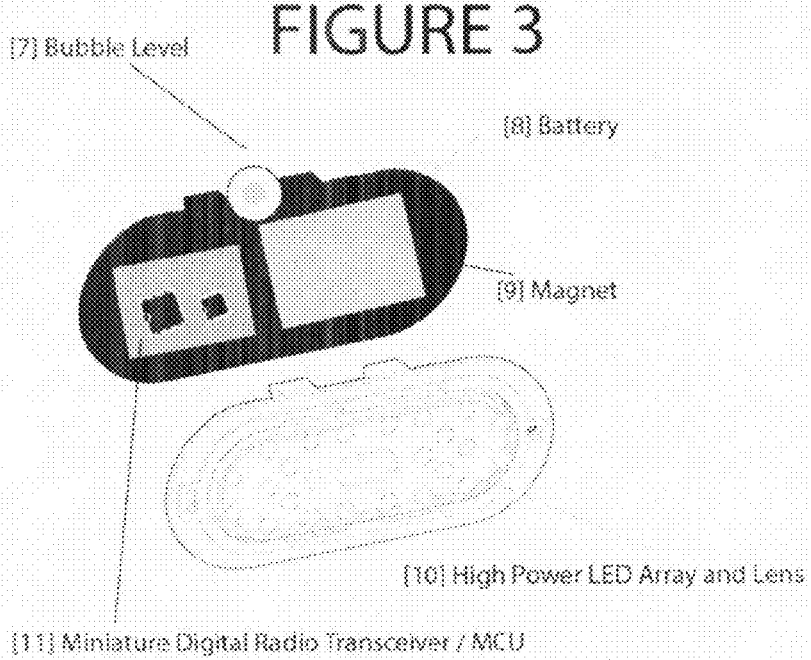

FIG. 3 (Removable Signal Lamp) illustrates a perspective view (simplified in the shape of chassis design) of a magnetic, self-powered (independent of vehicle) remotely-controlled (via digital radio) signal unit. The unit utilizes a magnet (9) for the temporary attachment of the unit to the vehicle, a DOT approved brightness bank of high-output LED lamps (10), a miniature digital radio and IC for LED actuation, fault-sensing and repeating of signals to other system components (ii), and a bubble level attached to the signal unit for alignment on the vehicle (7). The clear advantage of this signal is that it can be removed temporarily when desired for the showing of the car as "original." The lamp may be used on the front, rear, or high-mount stop lamp positions. It can produce a turn, tail or brake light depending on signals from the controller unit or on another system device.

Figure 4:
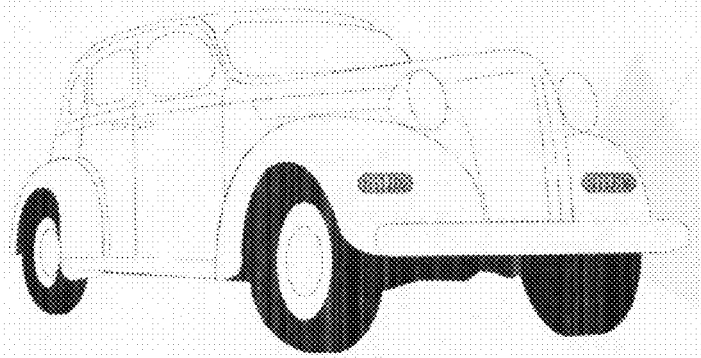

FIG. 4 is a simple illustration of the placement of the magnetic, self-powered version of the removable signal (described in FIG. 3) on an antique vehicle. It provides context to the other system parts. (12)

OTHER TECHNICAL DETAILS

A high frequency 2.4 Ghz ISM band was chosen for its small antenna size and the worldwide availability of this spectrum for the radios on all three system components. The digital radio technology is the 802.15.4 Zigbee or MiWi stack. All radio ICs perform packet checking and data acknowledgment to ensure signal receipt by the various components, and perform decoding and encoding of a unique serial address for each of the system components, and monitor for system faults providing assurance of function or indication of fault for the user.

Each of the three system components runs a custom programmed firmware, which has unique features like a unique digital serial number (to discourage theft) and a unique device ID for communication identification. Firmware can be updated by the manufacturer on the board.

On the removable signal lamp, a high capacity, approximately 3 amp hour rechargeable lithium-ion battery is used for power to allow for a maximum drive time. A high power bank of high power and high efficiency LEDs (such as the 100 lm OSRAM Dragon Plus) fitted with dispersion lenses produce the necessary brightness at multiple angles, while using very little current. As a result of the ultra low consumption radio and MCU and the high efficiency LEDs, the unit uses such low power levels that the actual run time of the radios and lighting provide a practical use of more than 500 miles of driving time per charge when used under normal driving conditions.

The small size and weight of the unit, approximately 60 mm×60 mm×60 mm make it an unobtrusive yet potent light source, easily removed and stowed. A powerful neodymium rare earth magnet with a pull force of 70 pounds holds the unit securely to the vehicle.

On the transceiver bulb, miniature (less than 5 mm) and extremely low-power radio IC's and micro controllers allow via traditional rigid PC board and or flexible multi layer PC board in a helical or non-planar shapes allow for the fitment of an entire remote control and oscillation circuit and antenna into the tiny area of a traditional automotive tail light bulb.

Ultra miniature surface mount components and a bank of high output LEDs (such as the OSRAM Dragon Plus) and dispersion lenses inside the housing provide greatly improved luminosity when compared to old 6V bulbs, providing the output of a standard filament bulb but at a fraction of the energy use, and allow digital remote control of the bulb brightness and flash rate from the controller device effectively making the bulb "universal" for use as turn, marker, tail, brake, or reverse functions.

In this system, for the first time, modern miniature electronics, extremely low power digital 802.15.4 radios, along with programmed system logic on an embedded microprocessor, and emergent high power, low voltage, high-efficiency LED lighting, combine in a novel and synergistic way to provide modern signaling and safety functions for antique vehicles.

While the above description contains many specifics, these should not be construed as limitations on the scope of the invention, but as exemplifications of the presently preferred embodiments thereof. Many other ramifications and variations are possible within the teachings of this invention. A system may use all or parts of this system, or include future safety devices to compliment the function and improve the safety for the antique vehicle owner. Thus, the scope of the invention should be determined by the appended claims and their legal equivalents, and not by the examples given.

I claim:

1. A system for an antique vehicle to generate traffic illumination signals comprising a self contained, removable signal control unit, adapted for placement inside said antique vehicle and responsive to manual commands from a driver of said antique vehicle to generate radio control signals associated with different vehicle traffic signals, an illumination device responsive to said radio control signals to generate different traffic control signals visible from outside said antique vehicle, said illumination device having light emitting diodes housed in a transparent enclosure, illumination circuitry for energizing said diodes, said enclosure, light emitting diodes and illumination circuitry combined into a single, integral package adapted for mounting in a preexisting socket coupled to a antique vehicle power source.

2. A wireless signaling control and illumination system for antique vehicles comprising: a wireless, removable, in-antique-vehicle signal control unit that controls vehicular traffic illumination lamps on antique vehicles, a transceiver lamp unit having mounted inside an ultra-miniature radio and IC microprocessor code generator/decoder, electrically configured to receive from and or transmit instructions from the control unit in order to control illumination of the lamp unit, wherein at least one lamp unit circuitry is housed in a readily-removable housing and or optionally mounted inside an automotive light bulb to be received in an existing light bulb socket of the antique vehicle.

3. A wireless traffic and illumination system for antique vehicles as described in claim 2 further comprising at least one high power Light Emitting Diode (LED) for illumination.

4. A wireless traffic and illumination system for antique vehicles as described in claim 2 further comprising a fault-detection logic configured to alert the operator of a fault in the system.

5. A wireless traffic and illumination system for antique vehicles as described in claim 2 wherein the microprocessor controls the oscillation of the LED array duty cycle and brightness in the function of producing flashing and solid illumination of the LED array.

6. A wireless traffic and illumination system for antique vehicles as described in claim 2 wherein the transceiver lamp housing holds: the miniature radio and IC microprocessor code generator/decoder, light source in operative arrangement with the lens to provide illumination, a lens, a magnet, and a power source.

7. A wireless traffic and illumination system for antique vehicles comprising: a wireless, removable, in-antique-vehicle traffic signal control unit with radio transceiver that controls system signals and illumination; and at least one transceiver lamp unit including a miniature radio transceiver and IC microprocessor code generator/decoder; a light source electrically connected to the transceiver lamp unit and configured to receive radio transmissions from the in-antique-vehicle signal control unit in order to control illumination of the transceiver lamp, wherein the radio transceiver, IC microprocessor code generator/decoder are inside an automotive light bulb housing on the antique vehicle.

8. A wireless traffic and illumination system for antique vehicles as described in claim 7 further comprising at least one high power Light Emitting Diode (LED) for illumination.

9. A wireless traffic and illumination system for antique vehicles as described in claim 7 further comprising a fault-detection logic configured to alert the operator of a fault in the system.

10. A wireless traffic and illumination system for antique vehicles as described in claim 7 wherein the microprocessor controls the oscillation of the LED array duty cycle and brightness in the function of producing flashing and solid illumination of the LED array.

11. A wireless traffic and illumination system for antique vehicles as described in claim 7 wherein the transceiver lamp further comprises a housing that is readily attachable to and removable from the antique vehicle and configured to hold: the miniature radio and IC microprocessor code generator/decoder; a light source in operative arrangement with the lens to provide illumination; a lens to focus the light source; a magnet; and a power source.

12. A method of retrofitting an antique vehicle to have traffic signals without permanently altering the antique vehicle comprising: providing a wireless, removable, in-vehicle signal control unit with miniature radio for controlling system traffic signals and illumination, and removably placing the control unit in a passenger compartment of an antique vehicle and arranged to be readily manipulated by an operator of the antique vehicle, and providing at least one radio controlled traffic signal lamp unit having mounted inside a miniature radio remote control and IC microprocessor code generator/decoder, electrically connected to the signal lamp unit and configured to receive and or transmit radio transmissions from and to the in-antique-vehicle signal control unit in order to control illumination of the traffic signal lamp unit, and, the step of removably mounting the traffic signal lamp with miniature radio and circuit inside an existing bulb socket on the antique vehicle and or within a housing removabably placed on the body of the antique vehicle.

13. A method of retrofitting an antique vehicle with traffic signals as described in claim 12 where the removable traffic signal lamp is powered by a battery and is removably attached with a magnet.

14. A method of retrofitting an antique vehicle with temporarily-mounted traffic signal lamps with the step of removably placing a remote control, wireless signal control unit in a passenger compartment of the antique vehicle, and removably placing a radio controlled light bulb unit with at least one miniature radio and microprocessor contained inside the bulb housing, and the step of the antique vehicle driver actuating the radio controlled light bulb from the signal control unit to change the illumination and oscillation of the radio controlled bulb for traffic indication or safety illumination of the antique vehicles.

15. A method of retrofitting an antique vehicle with traffic signals as described in claim 14 where the light source for the traffic signal lamp is at least one light emitting diode (LED).

16. A method of retrofitting an antique vehicle with traffic signals as described in claim 14 wherein the system uses fault detection to provide confirmation of working signals while or before the vehicle is in motion.

17. A method of retrofitting an antique vehicle with traffic signals wherein the method comprises the step of inserting a automotive light bulb unit with miniature embedded radio circuit inside the bulb housing, and the step of removably placing the bulb unit on a antique vehicle for actuation of oscillation and brightness of the light bulb by remote control by a driver of the antique vehicle, and the step of placing and actuating a self-contained and readily removable remote control device to control and or change the illumination and traffic signal meaning of the automotive light bulb by the remote control controller unit.

18. A method of retrofitting an antique vehicle with traffic signals as described in claim 17 wherein the light bulb with miniature embedded radio uses at least one high power light emitting diode to provide a light source.

19. A method of retrofitting an antique vehicle with traffic signals as described in claim 17 where the radio is a transceiver capable of repeating and or confirming messages and can warn the antique vehicle operator of faults in the system.

20. A wireless traffic and illumination system for antique vehicles as described in claim 17 wherein the bulb unit further comprises, a housing with a magnet and a power source.

* * * * *